United States Patent [19]
Blyler, Jr. et al.

[11] Patent Number: 5,257,329
[45] Date of Patent: Oct. 26, 1993

[54] DEPOLARIZATION OF LIGHT IN AN OPTICAL SWITCHING SYSTEM

[75] Inventors: Lee L. Blyler, Jr., Basking Ridge; Robert W. Filas, Bridgewater, both of N.J.; Gary J. Grimes, Thornton, Colo.

[73] Assignee: AT&T Bell Laboratories, Murray Hill, N.J.

[21] Appl. No.: 800,792

[22] Filed: Nov. 27, 1991

[51] Int. Cl.$^5$ .............................................. G02B 6/16
[52] U.S. Cl. ...................................... 385/11; 385/125
[58] Field of Search ................. 385/11, 123, 124, 125, 385/126, 127, 128

[56] References Cited

U.S. PATENT DOCUMENTS

| | | | |
|---|---|---|---|
| 4,195,907 | 4/1980 | Zamja et al. | 350/96.32 |
| 4,422,719 | 12/1983 | Orcutt | 350/96.30 |
| 4,466,697 | 8/1984 | Daniel | 350/96.30 |
| 4,715,700 | 12/1987 | Daniel | 385/31 |
| 4,733,929 | 3/1988 | Brown | 350/96.15 |
| 4,794,933 | 12/1990 | Ainslie et al. | 350/96.34 |
| 4,936,650 | 6/1990 | Ainslie et al. | 385/141 |
| 5,021,928 | 6/1991 | Daniel | 362/32 |
| 5,117,472 | 5/1992 | Blyler, Jr. et al. | 385/28 |

FOREIGN PATENT DOCUMENTS 1558404 1/1980 United Kingdom .

OTHER PUBLICATIONS

Max Born and Emil Wolf, *Principles of Optics*, Pergamon Press, Inc., NY 10523, 1980, 633–647.

*Primary Examiner*—Frank Gonzalez
*Attorney, Agent, or Firm*—John C. Moran

[57] ABSTRACT

Depolarization of light by utilizing a small concentration of refractive or diffractive microparticles in an optical core of an optical coupler that is coupling light from polarized source to a polarization type optical switch such as a ferroelectric liquid crystal. The result is that light from the laser is bent slightly by either the refractive or diffractive effects of the microspheres which causes scattering; and as a consequence, the light is depolarized in a relatively short distance within the optical core before reaching the liquid crystal switch. The microparticles maybe closely matched to the index of refraction of the core material resulting in smaller deflection angles and lower reflections. In addition, these microparticles match the specific gravity of the core material such that they do not settle out of suspension while the core material is being hardened from a semi-liquid state.

8 Claims, 3 Drawing Sheets

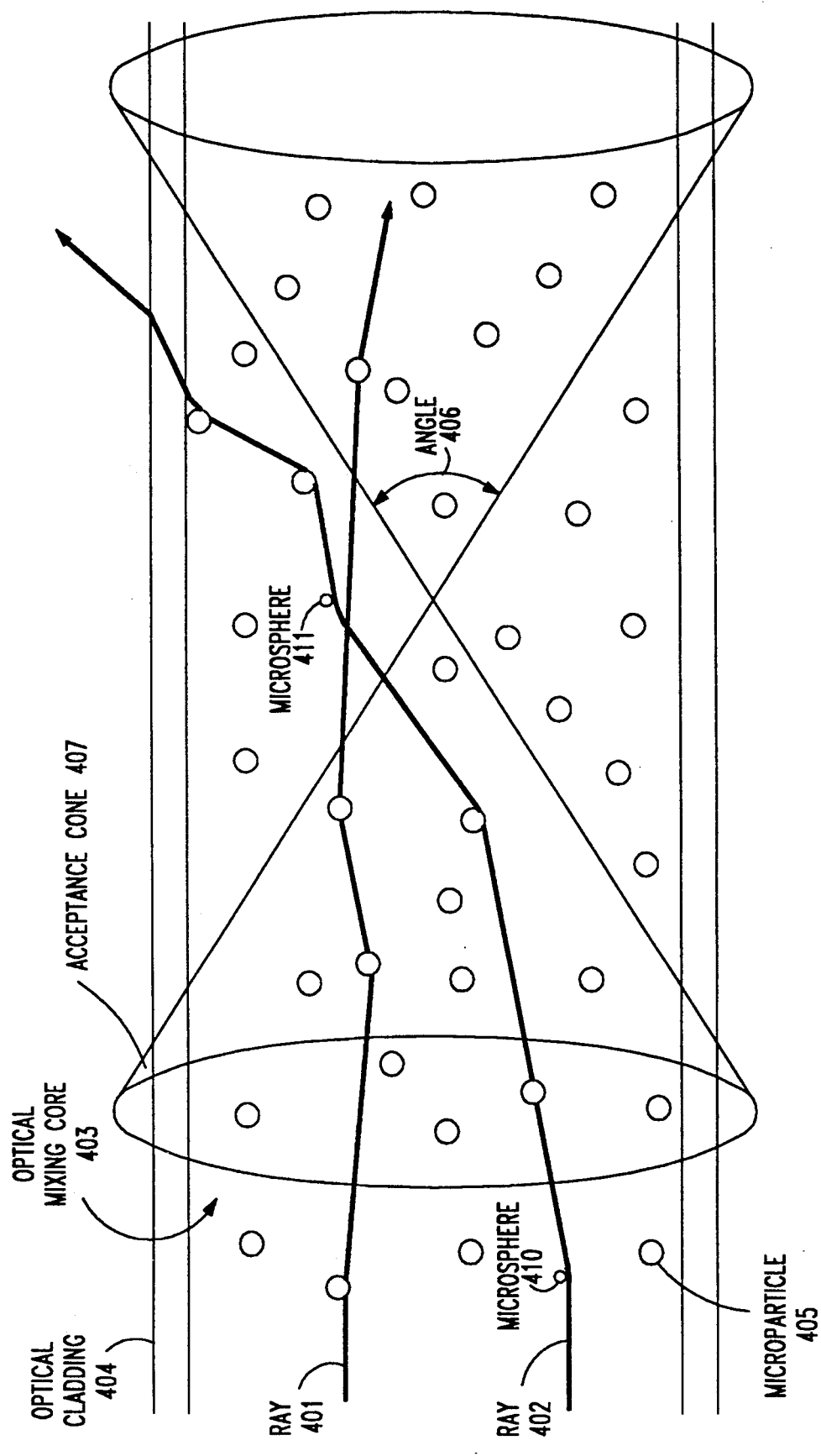

DEPOLARIZATION OF LIGHT IN AN OPTICAL SWITCHING SYSTEM

TECHNICAL FIELD

The present invention relates to the communication of light in an optical system, and in particular, to depolarization of light in such a system.

BACKGROUND OF THE INVENTION

A problem arises in an optical switching system which performs switching using spatial light modulator arrays as switching elements when the spatial light modulator arrays require depolarized light and the light sources produce a highly polarized light. Lasers are used in optical switching systems in order to achieve large splitting ratios to make the large optical switches and to achieve high transmission rates. The problem arises because a laser is a highly polarized light source having a polarization ratio of approximately 100 to 1. A spatial light modulator such as a ferroelectric liquid crystal array is sensitive to the polarization orientation of the light. This is because a liquid crystal or any other type of polarization routing switch typically has an input polarizer and an output polarizer which is rotated 90° with respect to the input polarizer. When the state of the material between the polarizers is such that there is no polarization rotation, much of the light is absorbed by the output polarizer. When the state of the material between the polarizers is in the appropriate state to cause a 90° polarization rotation, much of the light will pass through the output polarizer. There is a problem in using a polarized light source because the state of polarization might be such that most of the light is blocked from passing through the input polarizer. In order to overcome this problem in the prior art, each laser must be physically adjusted to have the proper polarization in order to work with polarization sensitive switching elements. As an alternative, it is also known to connect an optical fiber to the laser and then rotate the optical fiber to achieve the correct polarization. Either of these methods however causes a large number of problems during the manufacturing, installation and field support of an optical switching system.

SUMMARY OF THE INVENTION

The aforementioned problem is solved and a technical advance is achieved in the art by utilizing a small concentration of refractive or diffractive microparticles in an optical core of an optical coupler that is coupling light from polarized source to a polarization type optical switch such as a liquid crystal switch. The result is that light from the laser is bent slightly by either the refractive or diffractive effects of the microparticles which causes multiple scattering; and as a consequence, the light is depolarized in a relatively short distance within the optical core before reaching the liquid crystal switch. Advantageously, the microparticles in one embodiment are closely matched to the index of refraction of the core material resulting in smaller deflection angles and lower reflections. In addition, these microparticles match the specific gravity of the core material such that they do not settle out of suspension while the core material is being hardened from a semi-liquid state.

Other and further aspects of the present invention will become apparent during the course of the following description and by reference to the accompanying drawing.

BRIEF DESCRIPTION OF THE DRAWING

Referring now to the drawing:

FIG. 4 illustrates the refractive and diffractive actions of a plurality of microparticles within the optical coupler.

DETAILED DESCRIPTION

Figure 1:
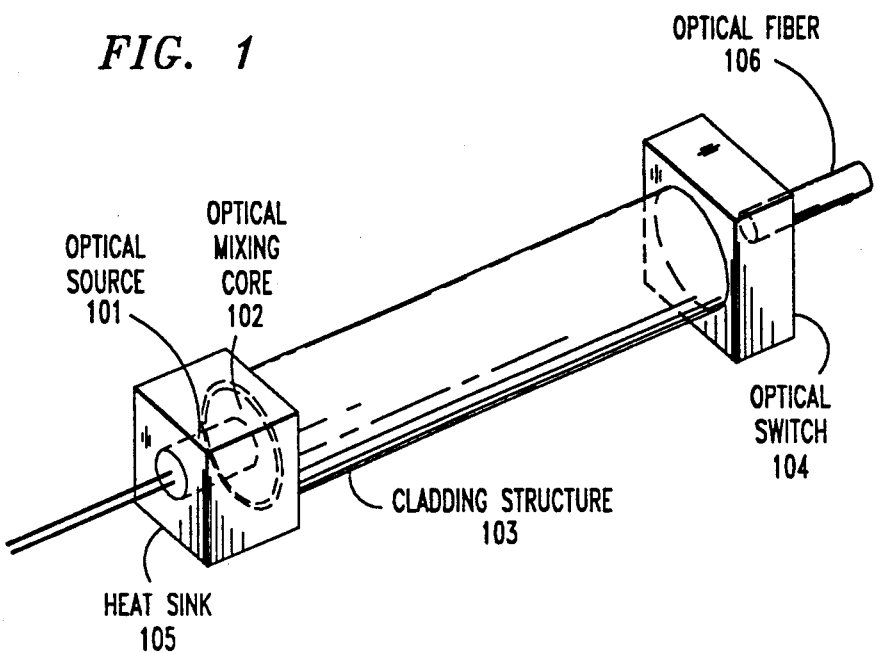
FIG. 1 illustrates a single optical switch interconnected to an optical source by an optical coupler.

FIG. 1 illustrates one embodiment of an optical coupler that is utilized to couple light between an optical source and an optical switch. The optical switch is utilized to determine whether or not light from the optical source will be communicated to the optical fiber 106. Optical mixing core 102 fills cladding structure 103 such that contact is made with liquid crystal switch 104 and optical mixing core 102. Optical source 101 and heat sink 105 are attached to the optical mixing core 102 and cladding structure 103. In accordance with the invention, small concentrations of refractive and/or diffractice particles may be added to the suspension material of optical mixing core 102. These particles have a typical dimension of 0.1 to 500 microns and will be hereafter be referred to as microparticles. The smaller microparticles have a strong diffractive effect and a weak refractive effect; whereas, the larger microparticles have a strong effect and a weak diffractive effect. As light is transmitted by optical source 101 into optical mixing core 102 toward optical switch 104, the light is bent slightly by the various microparticles either due to diffraction or refraction effects. As a result of multiple random interactions with microparticles, the light becomes depolarized over the distance between optical source 101 and optical switch 104 due to multiple scattering of the light by the microparticles. It is well known that this depolarization effect will take place as the light is multiple scattered by the microparticles.

In this embodiment, optical source 101 is advantageously a laser; however, the invention could be utilized with any highly polarized light source. In addition, this embodiment illustrates that optical source 101 is attached directly to the optical mixing core 102. In many applications, the light from optical source 101 would be transported to optical mixing core 102 by an optical fiber. Advantageously, in this embodiment, optical switch 104 is a ferroelectric liquid crystal spatial light modulator. However, optical switch 104 could be a magneto-optical or nematic liquid crystal spatial light modulator.

Figure 2:
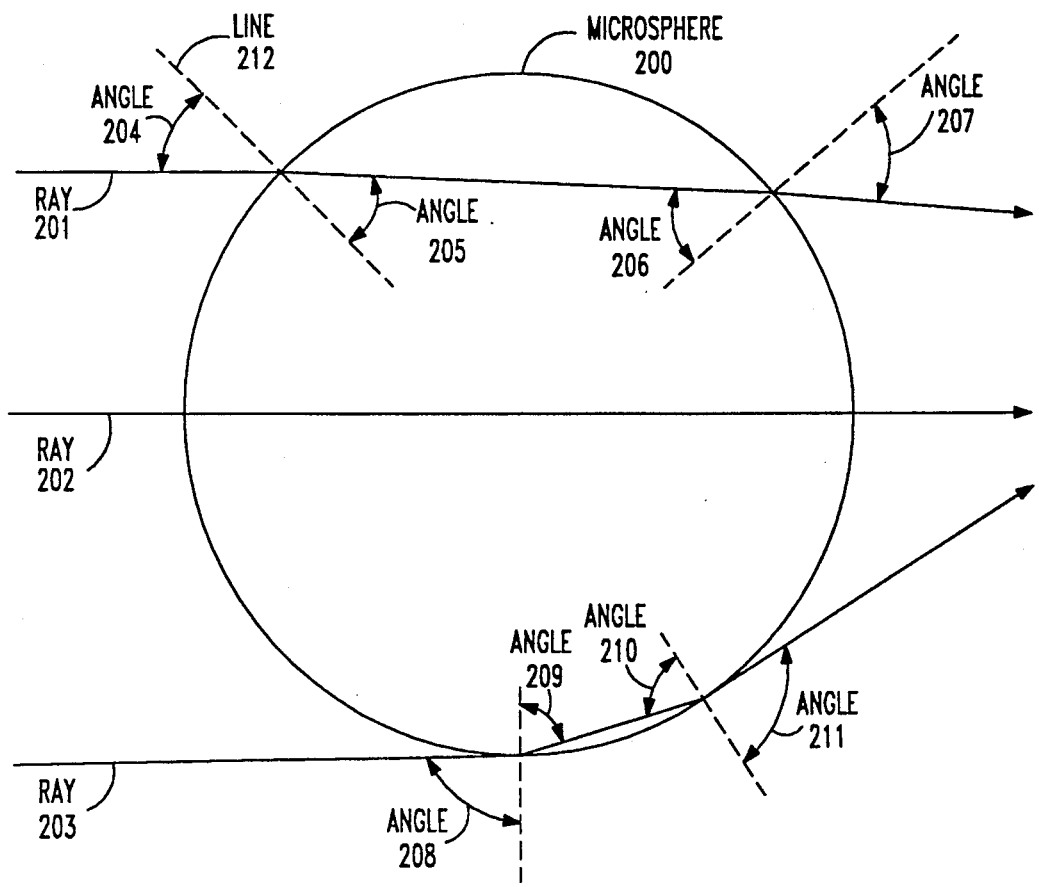
FIG. 2 illustrates the refractive action of a microparticle within the optical coupler.

To understand the manner in which the refractive microparticles cause light to be bent resulting in multiple scattering which causes depolarization, consider FIG. 2 which illustrates three rays of light striking a single microparticle (illustrated as a sphere) and being refracted. FIG. 2 illustrates only a two-dimensional representation of the effects that an individual microparticle has within optical mixing core 102 of FIG. 1. For discussion purposes, microparticle 200 is assumed to have a refractive index of 1.46 and is suspended in a material having a refractive index of 1.40. All refractive indices referred to herein are measured at the wavelength of the sodium D-line. The dashed lines illustrated in FIG. 2, i.e. line 212, are perpendicular to microparticle 200.

When a ray of light passes from one material to another material, the amount of refraction that occurs is defined by Snell's law of refraction which defines the angle of refraction by using the angle of incidence and the refractive indices of the two materials. Snell's equation is as follows:

$$n_1 \sin \theta_1 = n_2 \sin \theta_2 \quad (1)$$

where $n_1$ is the refractive index of the material that the light ray is leaving; $\theta_1$ is the angle of incidence; $n_2$ is the refractive index of the material the light ray is entering; and $\theta_2$ is the angle of refraction. Applying Snell's law to FIG. 2, ray 202 strikes microparticle 200 perpendicularly to its surface. Consequently, ray 202 is not bent by refraction. Ray 201 enters microparticle 200 with an angle of incidence equal to angle 204, which is 45 degrees. Applying Equation 1, the angle of refraction (angle 205) is 42.6 degrees. Ray 201 leaves microparticle 200 with an angle of incidence (angle 206) equal to angle 205. The angle of refraction (angle 207) upon exiting microparticle 200 is 45 degrees. The total deflection of ray 201 caused by the two refractions (angles 205 and 207) is 4.9 degrees from the original direction of travel of ray 201. When the angle of travel is changed, the propagating waveguide mode of the ray is necessarily changed. Since a light ray begins with predominantly lower order modes, the probability of shifting a ray from a lower order mode to a higher order mode is higher than the reverse.

Ray 203 is intended to show a situation where a ray of light strikes a microparticle at such an angle that it is substantially bent. In this example, ray 203 strikes microparticle 200 at an angle of incidence (angle 208) equaling 89 degrees, resulting in an angle of refraction (angle 209) equaling 73.4 degrees. Ray 203 leaves microparticle 200 with an angle of incidence (angle 210) equaling 73.4 degrees. The angle of refraction (angle 211) upon exiting microparticle 200 equals 89 degrees. The total deflection caused by the two refractions is 32 degrees from the original direction of travel of ray 203. With respect to FIG. 2, the probability of a light ray striking a microparticle with a high angle of incidence, e.g. ray 203, is less than the probability of a light ray striking a microparticle with a relatively low angle of incidence, e.g. rays 201 and 202. (The reason for this difference of probabilities is that a microparticle presents less surface area to rays striking at angles such as angle 208.) Thus, most of the rays passing through the coupler will experience relatively small deflections. This is important because if light strikes optical cladding structure 103 of FIG. 1 at an angle greater than the acceptance angle of the optical coupler, the light is lost through that cladding structure.

Figure 3:
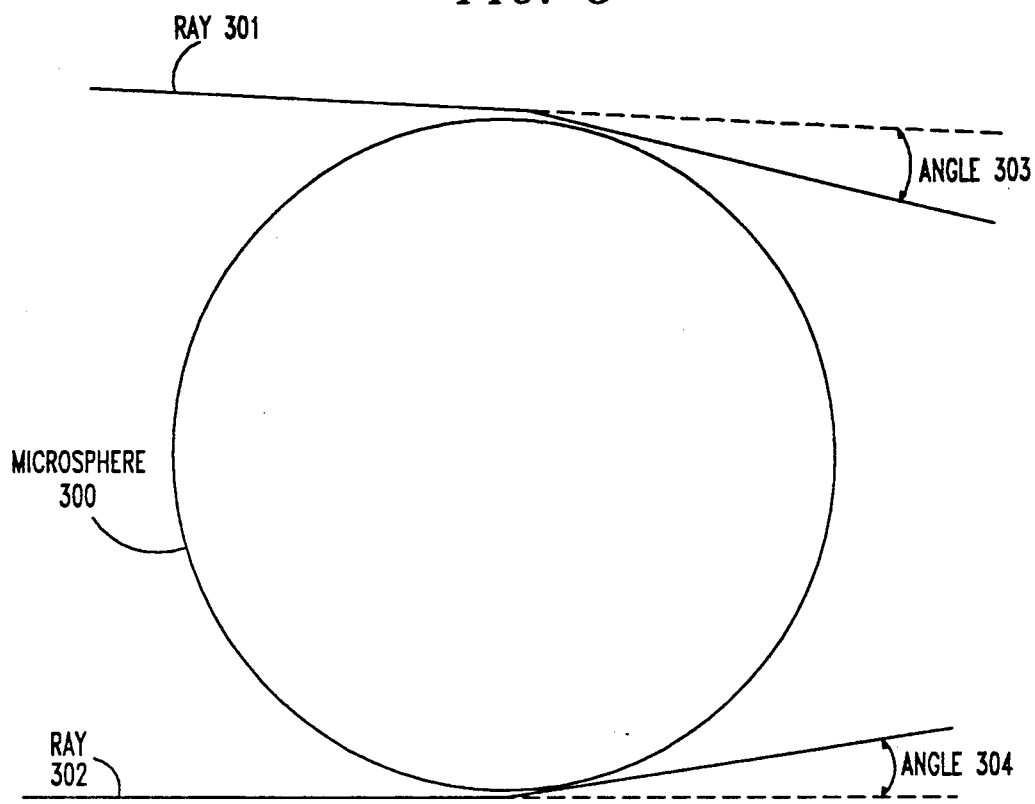
FIG. 3 illustrates the diffractive action of a microparticle within the optical coupler.

To understand the manner in which the diffractive microparticles cause light to be bent resulting in multiple scattering which causes depolarization, consider FIG. 3 which illustrates two rays of light being diffracted by a single microparticle (illustrated as a sphere). FIG. 3 illustrates only a two-dimensional representation of the effects that an individual microparticle has within optical mixing core 102 of FIG. 1. The amount of diffraction takes place with respect to rays 301 and 302 is defined by angles 303 and 304, respectively. These angles can be calculated as set forth in the book entitled *Introduction to Classical and Modern Optics*, Prentice-Hall, Inc., Englewood Cliffs, N.J., Jurgen R. Meyer-Arendt, 1972, pps. 354-356.

Returning to a discussion of the acceptance angle, Equation 2 gives the acceptance angle as follows:

$$\text{acceptance angle} = \sin^{-1}\sqrt{n_1^2 - n_2^2} \quad (2)$$

where $n_1$ is the refractive index of the optical mixing core and $n_2$ is the refractive index of the optical cladding structure. To illustrate further how light is lost through the optical cladding, consider FIG. 4. The material of optical cladding 404 is assumed to have a refractive index of 1.33. Because of the small concentrations of microparticles in optical mixing core 403, the effect of these microparticles on the refractive index is ignored; and the refractive index of optical mixing core 403 is thus assumed to be that of the suspension material. This material is assumed to have a refractive index of 1.4. Applying these refractive indices to Equation 2, the acceptance angle for the structure illustrated in FIG. 4 is 26.7 degrees, resulting in angle 406 being 53.4 degrees.

FIG. 4 illustrates an acceptance cone defining the acceptance angle with angle 406 being twice the acceptance angle. Clearly, a ray experiencing a large deflection, such as ray 203 of FIG. 2, exits from FIG. 4 after one encounter with a microparticle since the resulting angle exceeds the acceptance angle of 26.7 degrees. This result occurs unless the ray strikes another microparticle that corrects the deflection angle to be within the acceptance cone. As FIG. 4 illustrates, ray 401 strikes microparticles in such a way as to stay within the acceptance cone as defined by angle 406. Microparticles 405, 410, and 411 illustrate the microparticles. The majority of the rays entering the optical coupler formed by optical cladding 404 and optical mixing core 403 will be deflected in a manner similar to that of ray 401. However, a minority of the rays will be lost through optical cladding 404 because the sum of their angles of refraction and diffraction will exceed the acceptance angle. An example of such a ray is illustrated by ray 402. (In FIG. 4, the microparticles are illustrated as being separate from each other; however, they may also be connected together.)

In the second embodiment, the optical core material utilizes a suspension material of silicone elastomer with a refractive microparticle concentration of 1% to 10% by weight. The microparticles are composed of poly(isobutyl methacrylate). Each microparticle is roughly spherical and has a maximum dimension of less than 105 microns. The suspension material is composed of 0.05% PC 085 in PS 783 mixed with PS 129.8 in a mass ratio of 30.5 (PS 783/PS 129.8). PC 085, PS 783, and PS 129.8 are commercially available from Petrarch Systems, Inc (Huls America, Inc.). The microparticles and suspension material have indices of refraction of 1.477 and 1.463, respectively. This similarity of indices of refraction produces smaller deflection angles and fewer reflections which produce less light loss in the optical coupler. This similarity also allows for higher concentrations of microparticles to be used and reduces the length of the optical mixing core. Further, the resulting optical core material closely matches the refractive index of germanium-doped silicon dioxide, which is commonly used for the optical core material of optical fibers. This matching results in reduced reflections between the optical fibers and optical core material. Finally, the microparticles closely match the specific gravity of the suspension material so that they do not settle out during storage or curing. The suspension material has a specific gravity of 1.028 and the microparticles have a specific gravity of 1.045.

Figure 5:
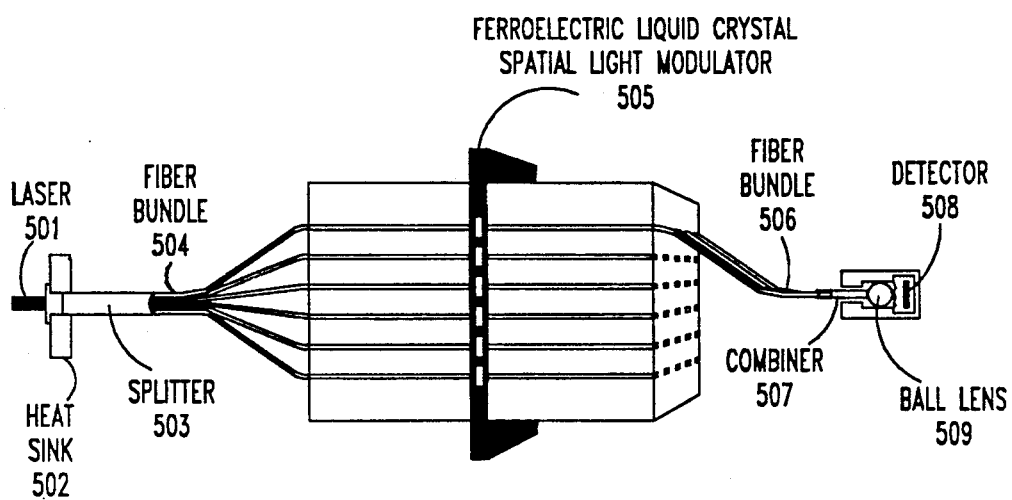
FIG. 5 illustrates an optical switching network in accordance with the present invention.

FIG. 5 illustrates a photonic switch. Although not illustrated, there is a plurality of lasers such as laser 501 with one laser per column of spatial light modulator 505. Similarly, there is a plurality of detectors such as detector 508 with one detector per row of spatial light modulator 505. Splitter 503 transfers the light from laser 501 to the optical fibers of fiber bundle 504. Similarly, combiner 507 combines light from fiber bundle 506 for detection by detector 508. In accordance with the invention, the microparticles are suspended in a suspension material of splitter 503 and function in accordance with the invention to depolarize light generated by laser 501.

It is to be understood that the above-described embodiments are merely illustrative of the principles of the invention and that other arrangements may be devised by those skilled in the art without departing from the spirit and scope of the invention. In particular, one skilled in the art can devise other materials for the microparticles and suspension material. Further, one skilled in the art can devise other concentrations, sizes, and shapes of microparticles and path lengths. The principles of the invention also can be applied to fabricate other optical devices.

We claim:

1. An optical device for the depolarization of light, comprising:
    an optical cladding structure;
    an optical core within said optical cladding structure for communicating light from an input of said optical core to an output of said optical core; and
    said optical core comprising a plurality of particles suspended in a suspension material for depolarizing said light by scattering said light and said plurality of particles having an index of refraction approximately equal to an index of refraction of said suspension material so as to reduce the amount of said light being lost through said cladding structure.

2. The optical device of claim 1 wherein said plurality of particles scatter said light by diffracting said light.

3. The optical device of claim 1 wherein said plurality of particles scatter said light by refracting said light.

4. The optical device of claim 1 wherein specific gravities of said suspension material and said particles are approximately equal whereby said particles remain suspended in said suspension material for long periods of time.

5. The optical device of claim 1 wherein said suspension material is a cross-linkable silicone resin and said particles are fabricated from silicon dioxide.

6. The optical device of claim 5 wherein some of said particles are an aggregation of smaller particles.

7. The optical device of claim 1 wherein said suspension material is silicone elastomer and said particles are fabricated from poly(isobutyl methacrylate).

8. The optical device of claim 7 wherein each of said particles has a dimension of 0.1 to 500 microns.

* * * * *